June 3, 1969   L. E. WALDEN   3,447,255
TROLLING DEVICE
Filed March 27, 1967

INVENTOR
LUTHER E. WALDEN
BY
*Fetherstonhaugh & Co.*
ATTORNEYS

United States Patent Office 3,447,255
Patented June 3, 1969

3,447,255
TROLLING DEVICE
Luther E. Walden, Vancouver, British Columbia, Canada, assignor of fifty percent to John J. Kozak, North Vancouver, British Columbia, Canada
Filed Mar. 27, 1967, Ser. No. 626,100
Int. Cl. A01k 95/00
U.S. Cl. 43—43.13                          8 Claims

ABSTRACT OF THE DISCLOSURE

A trolling device connectable to a trolling line having a van pivotally connected at the rear end of the device and normally assuming a downwardly and forwardly inclined operative position when the device is moved through the water. A lever has a connection with a hook line and is operatively connected to the vane. When a predetermined pull is exerted on the hook line, the lever is adapted to move the vane from its operative position to a non-operative position in line with the direction of movement of the device through the water. The device is equipped with stop means to limit movement of the vane, and has a pivotally mounted substantially rigid guard slidably attached to the vane.

Background of the invention

The present invention relates to vane equipped trolling devices for maintaining a lure in a submerged condition. The invention more particularly relates to device of this nature which, when the fishing line is subject to the pressure of a hooked fish, provides for movement of the vane to a position in line with the direction of movement of the device through the water so as to facilitate its easy passage therethrough.

Trolling devices of this nature and having these characteristics have heretofore been devised. However, such devices of prior art have required the use of triggers, trips, ratchets and the like to provide for movement of the vane or vanes with which they are equipped thereby making them relatively expensive to fabricate and rendering them to be easily subject to damage.

Summary of the invention

The trolling device, in accordance with the present invention, is very simple and automatic of operation, the movable vane thereon being moved in one direction by the pressure of water thereagainst and being moved in the opposite direction by a predetermined pull such as is exerted by a fish upon the line, thereby eliminating the necessity for triggers, springs or the like which normally require the presetting of the vane or vanes before the trolling device is lowered into the water.

In order to attain these ends, the trolling device of the present invention comprises a fore and aft elongated body connectable at its forward end to a trolling line, an elongated vane arranged beneath the body pivotally connected to the after end thereof for fore and aft swinging movement, said vane having a free end, stop means on the body engageable with the vane for limiting the swinging movement of the latter between a non-operative position in which said vane extends beneath and parallel to the body and in operative position in which said vane is inclined forwardly and downwardly therefrom.

Description of the preferred embodiments

Figure 1:
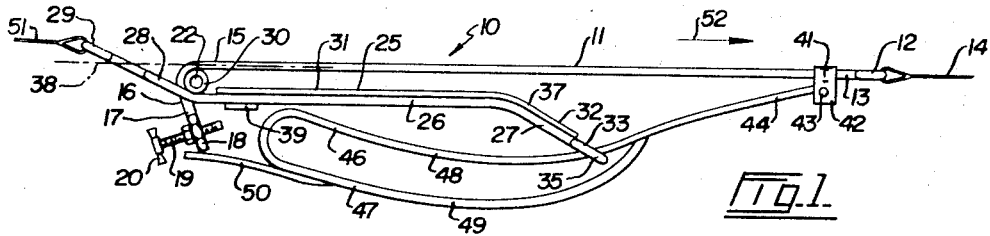
FIGURES 1 and 2 are side and plan views, respectively, of one of the embodiments of the invention in its non-operative condition.
Figure 2:
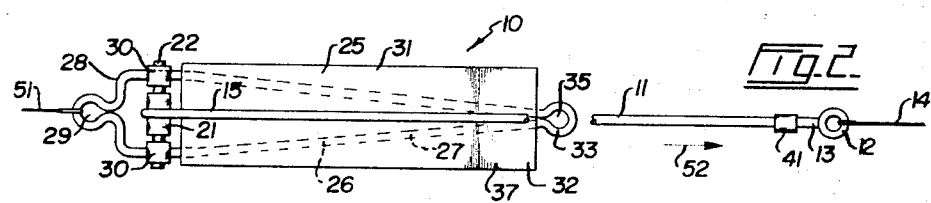
Figure 3:
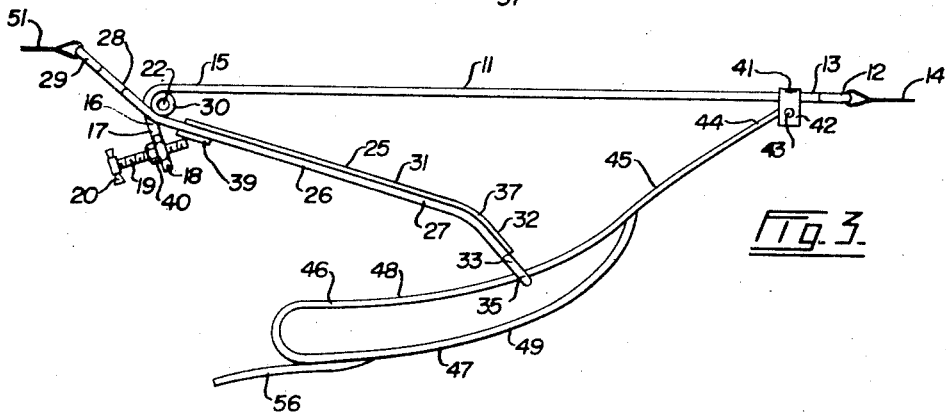
FIGURE 3 is a side view of the invention of FIGURES 1 and 2 in an operative condition.

FIGURES 1 to 3 of the drawings illustrate one embodiment 10 of the invention. The trolling device 10 has an elongated body preferably formed of a length of stiff brass rod or any other stiff non-corrosive material, and which has formed a loop 12 at its front end 13. To this loop 12 a trolling line 14 may be secured.

Adjacent its after end 15, the body 11 has a downwardly bent supporting portion 16 at the lower end 17 of which a nut 18 is secured as by brazing. Through nut 18 extends an elongated screw 19 having a handle 20 at one end, said screw extending forwardly beneath the body 11.

At the juncture of the supporting portion 16 and body 11, a transversely extending short sleeve 21 is secured as by brazing, said sleeve being adapted to rotatably receive a hinge pin 22 which extends outwardly at opposite ends through the ends of the sleeve. Rotatably mounted on this hinge pin 22 is a vane assembly 25. This assembly includes a supporting frame 26 which is preferably formed of a length of stiff brass wire suitably formed into an elongated loop having an elongated forwardly tapering forward portion 27 and a relatively wide but short after portion 28, the latter being twisted centrally to form a loop 29. This supporting frame 26, at the juncture of the forward portion 27 and after portion 28, has a pair of hinge sleeves 30 affixed thereto as by brazing, said hinge sleeves being in registry with each other and being spaced apart a distance a little greater than the length of the sleeve 21 and being adapted to rotatably receive the hinge pin 22.

Secured to the forward portion 27 of the supporting frame 26 is a vane 31 which is elongated in a fore and aft direction, said vane extending at its forward end 32 just short of the forward end 33 of said forward portion 27, said forward end 33 of said forward portion thereby forming an eye 35. The vane 31 is straight for the greater part of its length forwardly of the hinge pin 22 and is bent adjacent its forward end slightly out of its general plane to form a downwardly inclined tip portion 37, the supporting frame 26 following the general curvature of said tip portion. Referring to FIGURE 1, it will be seen that when the vane is arranged parallel to the body 11, the tip portion 37 of said vane inclines downwardly and forwardly at an acute angle to the said body 11.

The after portion 28 of the supporting frame 26 is bent upwardly slightly out of the general plane of the vane so that when the vane is placed in position in FIGURE 1, which hereinafter will be called the non-operative position, the loop 29 of said after portion 28 lies above the longitudinal axis 38 of the body 11. The supporting frame 26 is also provided with a cross bar 39 which extends transversely below the vane 31 and which is adapted to be engaged by the adjusting screw 19 when the vane is swung from its non-operative position as illustrated in FIGURE 1 to an operative position as illustrated in FIGURE 3. It will be appreciated that by simple adjustment of the screw 19 which may be releasably locked in position by lock nut 40, the inclined position of the vane 31 relative to the body 11 may also be adjusted, it being preferred that the included angle between the vane and body 11 be an acute angle less than 45 degrees.

Mounted as by welding or brazing adjacent the forward end 13 of the body 11, is a bracket 41 having a pair of parallel spaced apart downwardly depending side plates 42. A pin 43 extends between the side plates 42 and rotatably mounted at its forward end 44 on said pin is an elongated guard arm 45. This guard arm is preferably formed of a length of heavy brass wire which is bent backwardly upon itself adjacent its after end 46 to form a fore and aft elongated loop 47, said loop having an upper member 48 and a lower member 49, the upper member 48 slidably extending through the eye 35, thereby linking the vane assembly 25 and guard arm 45 for cooperative movement between the positions as shown in FIGURES 1 and 3 of the drawings. The guard arm 45 is also provided with a tail 50 which may be formed of a short length of stiff brass wire connected, as by brazing, to the lower member 49 and extending rearwardly therefrom. This tail 50 is long enough so as to extend slightly rearwardly of and below the screw 19 when the device is arranged in its non-operative position as shown in FIGURE 1. The device 10 is, as hereinbefore mentioned, trolled at the end of a trolling line 14, the latter being tied to loop 12. A lure carrying a hook line 51 is tied to loop 29.

When the device is trolled through the water in the direction of the arrow 52, the downwardly inclined tip portion 37 will, under the action of the water, swing the vane from its non-operative position as illustrated in FIGURE 1 to its operative position as adjusted by the screw 19. The action of the water against the vane 31 will result in the submergence of the device 10 until it reaches a level at which the action of the vane is overcome by the upward pull on the trolling line 14.

The device will maintain this level until the lure is struck by a fish whose weight is transferred through the line 51 to the after portion 28 of the frame 26, said after portion serving as a lever to rotate the vane 31 upwardly against the said body 11. The additional weight or pull of the vane occasioned by its angular relationship to the direction of movement of the trolling device is therefore removed so that the angler does not have to fight the fish as well as the device. If the fish should escape, the device will immediately return to its operative position as illustrated in FIGURE 3 and said device will again submerge.

The provision of the guard arm 45 protects the vane from damage when the device meets an obstruction, such as a log or heavy seaweed or the like, as it is being trolled. The guard arm will be the first portion of the device to meet any obstruction and will swing upwardly moving the vane from its operative position as shown in FIGURE 3 to its non-operative position as shown in FIGURE 1. When the device passes over the obstruction, the tip portion 37 will immediately move the vane downwardly to its operative position.

Figure 4:
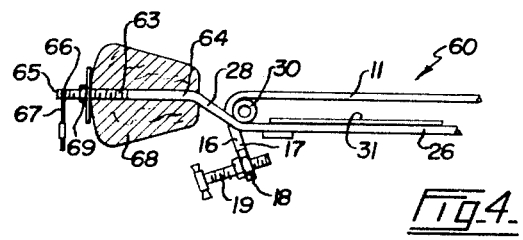
FIGURE 4 is a side view of a portion of another embodiment of the invention.

FIGURE 4 illustrates a portion of another embodiment 60 of the invention. As device 60 is similar to device 10, accordingly, components of device 60 which are identical to corresponding components of device 10 have been accorded the same numerals as the latter.

Device 60 includes the supporting frame 26 having the after portion 28. Device 60, however, differs from device 10 in that instead of having a loop 29 formed on said after portion, said loop is replaced with an elongated threaded shaft 63, one end 64 of which is connected to said after portion 28 by brazing or the like, and the other end 65 is provided with a hole 66 for engagement with a line connector 67. Over the shaft 63 is fitted a float 68 made of cork or the like which is maintained in position on the shaft by means of a nut 69 threadedly engaging the shaft and forcing the float 68 against said after portion 28 of the frame.

The operation of device 60 is identical to the operation of device 10. However, with the provision of the float 68, the automatic movement of the vane from its non-operative to its operative position is assured as the buoyancy of the float will always tend to rotate the latter portion 28 of the frame upwardly, thereby rotating the vane downwardly.

I claim:

1. A trolling device comprising a fore and aft elongated body connectable at its forward end to a trolling line, an elongated vane arranged beneath the body and pivotally connected to the after end thereof for fore and aft swinging movement, said vane having a free end, stop means engageable with the vane for limiting the swinging movement of the latter between a non-operative position in which said vane extends beneath and parallel to the body and an operative position in which said vane is inclined forwardly and downwardly therefrom, a lever on the vane and connectable to a hook line for moving the vane from its operative to its non-operative position against the pressure of the water thereon as the device is trolled when a predetermined pull is exerted on the hook line, and an elongated, substantially rigid guard arm swingably depending from the fore end of the body, said arm extending rearwardly beneath and having a slidable connection with the fore end of the vane and being adapted upon encountering an obstruction to swing upwardly and move the vane from its operative to its non-operative position.

2. A trolling device as claimed in claim 1 in which the vane is bent downwardly at its free end so as to form a downwardly inclined deflecting surface when the vane is arranged in its non-operative position.

3. A trolling device as claimed in claim 1 in which the stop means comprises a support depending from the after end of the body, beneath the vane, and a stop at the lower end of the support arranged in the path of the vane, said stop having a fore and aft adjustable engagement with the support whereby the inclination of the vane in its operative position may be adjusted.

4. A trolling device comprising a fore and aft elongated body connectable at its forward end to a trolling line, an elongated vane arranged beneath the body pivotally connected to the after end thereof for fore and aft swinging movement, said vane having a free end, an eye member at the free end of the vane, stop means on the body engageable with the vane for limiting the swinging movement of the latter between a non-operative position in which said vane extends beneath and parallel to the body and an operative position in which said vane is inclined forwardly and downwardly therefrom, an elongated lever connected to and extending rearwardly of and upwardly inclined relative to the vane, said lever being connectable at its after end to a hook line and being adapted when a predetermined pull is exerted on the hook line to swing the vane against the pressure of the water thereon when the device is trolled to its non-operative position.

5. A trolling device as claimed in claim 4 including a buoyant member connected to the lever and normally when said lever is not subject to said predetermined pull urging the latter to swing upwardly so as to swing the vane downwardly to its operative position.

6. A trolling device as claimed in claim 4 including an elongated substantially rigid guard arm swingably connected at one end to and depending from the fore end of the body for fore and aft swinging movement, said arm being slidably received by the eye member and extending rearwardly beneath the vane and, being adapted upon encountering an obstruction, to swing upwardly and move the vane to its non-operative position.

7. A trolling device as claimed in claim 4 in which the vane is bent downwardly at its free end so as to form a downwardly inclined deflecting surface when the vane is arranged in its non-operative position.

8. A trolling device as claimed in claim 4 in which the stop means comprises a support depending from the after end of the body beneath the vane, and a stop at the lower end of the support arranged in the path of the vane, said stop having a fore and aft adjustable engagement with the support whereby the inclination of the vane in its operative position may be adjusted.

References Cited

UNITED STATES PATENTS

| 1,861,237 | 5/1932 | Morgan et al. | 43—43.13 |
| 2,247,583 | 7/1941 | Louthan | 43—43.13 |
| 2,542,347 | 2/1951 | Muller | 43—43.13 |
| 2,891,345 | 6/1959 | Uhlén | 43—43.13 |
| 3,023,537 | 3/1962 | Madson | 43—43.13 |

SAMUEL KOREN, *Primary Examiner.*

JAMES H. CZERWONKY, *Assistant Examiner.*

U.S. Cl. X.R.

43—42.04, 42.22, 42.42, 44.97